United States Patent Office 3,467,673
Patented Sept. 16, 1969

3,467,673
OCTAHYDRO-5H-1-BENZAZEPIN-5-ONE,
CYCLIC ETHYLENE KETALS
Stephen Sallay, Wynnewood, Pa., assignor to American
Home Products Corporation, New York, N.Y., a corporation of Delaware
No Drawing. Original application Mar. 23, 1964, Ser. No. 354,117, now Patent No. 3,294,817, dated Dec. 27, 1966. Divided and this application Oct. 10, 1966, Ser. No. 585,317
Int. Cl. C07d 57/02, 95/00; A61k 27/00
U.S. Cl. 260—340.9                                6 Claims

ABSTRACT OF THE DISCLOSURE

The disclosure is directed to octahydro-5-H-1-benzazepin-5-one, cyclic ethylene ketals and related compounds. The compounds are useful as analgesics.

---

This application is a division of my prior copending application, Ser. No. 354,117, filed Mar. 23, 1964, which issued as Patent 3,294,817 on Dec. 27, 1966.

This invention relates to new chemical compounds. More particularly this invention relates to novel octahydroindolobenzazepines, to new compounds intermediate thereto and to the method by which these new compounds may be prepared.

The new octahydroindolobenzazepines encompassed within the present invention are those defined by the following formula:

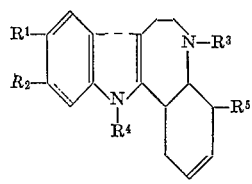

wherein $R^1$ and $R^2$ are selected from the group consisting of hydrogen, lower alkyl, lower alkoxy; $R^1$ and $R^2$ taken together are —$OCH_2O$—; $R^3$ is selected from the group consisting of hydrogen and benzyl; $R^4$ is selected from the group consisting of hydrogen, lower alkyl and benzyl; and $R^5$ is selected from the group consisting of hydrogen, lower alkyl and lower alkoxy and the pharmaceutically acceptable acid addition salts thereof.

The new compounds encompassed within those defined by Formula I have biological properties which make them useful for pharmacological purposes such as analgesics and depressants. When used for such purposes, they may be used alone or in combination with well-known and acceptable pharmaceutical carriers, the choice of which is determined by the preferred route of administration, the solubility of the compound and standard pharmaceutical practice. The dosage amount used will vary and be discretionary with the prescribing authority who shall consider the desired result, condition of the recipient and pattern of treatment intended.

As has been suggested in addition to the compounds encompassed within Formula I above, the present invention encompasses new and novel compounds which are intermediate thereto. These new compounds also possess valuable properties as will be described more completely hereinafter.

Reference now to the reaction sequence below will provide a better understanding of the new compounds of the present invention and of the method by which they are prepared:

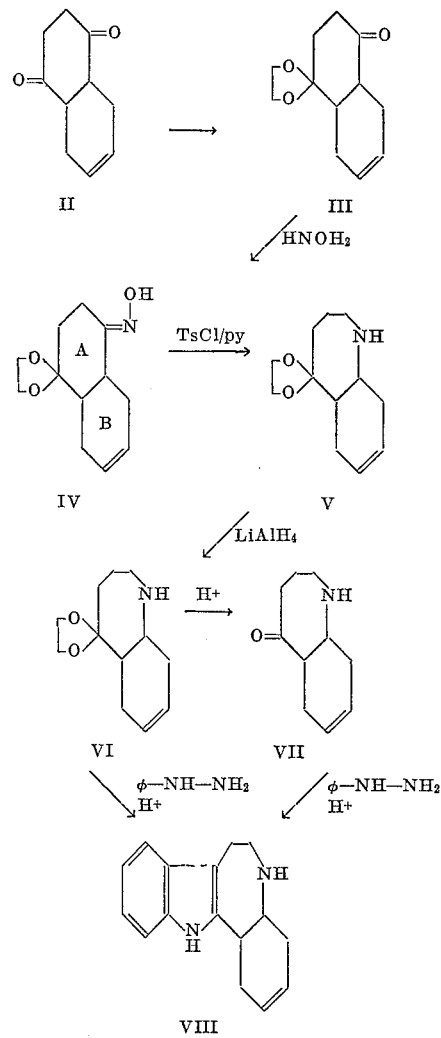

The foregoing reaction sequence while being directed to the preparation of a specie is representative of the method of preparing other compounds encompassed within Formula I above, particularly those having substituents at $R^1$, $R^2$ and $R^5$ as previously described.

The starting compound II, 2,3,4a,5,8,8a-hexahydro-1,4-naphthoquinone which may be prepared according to the method of O. Diels, K. Alder, Ber., 62, 2337, 1929; K. Alder and G. Stein, Ann., 501,247, 1933 is ketalized according to the method described in E. Cole et al., Soc. 1962, 260 to produce the naphthoquinone cyclic ketal III. It is, of course, understood that the starting naphthoquinone II may be suitably substituted as by $R^5$, previously defined, to provide the final product I with this desired substituent. Substitution of the starting compound II can be at the positions which are equivalent to the 1, 2, 3 or 4 position of the final product I, with the four (4) position being preferred.

The derivative IV is in and of itself a new and valuable compound and representative of a class of new compounds which include the $R^5$ substituent previously described. These new compounds IV (wherein $R^5$ is a substituent in the B ring of the original starting material in addition to being useful as intermediates to the final products I) are useful in and of themselves as central nervous system agents, in particular as depressants.

Treatment of the oxime ketal derivative IV with p-toluenesulfonylchloride in a solvent such as pyridine on heating to about 50° C. results in an exothermic reaction. After completion of the latter reaction, the reaction mixture is permitted to stand for 15–20 hours, poured onto icy-diluted HCl to yield on recrystallization the product V a benzazepine-2,5-dione, cyclic ketal, more properly identified as 3,4,5a,6,9,9a - tetrahydro - 1H - 1 - benzazepin - 2,5 - dione, cyclic 5-(ethylene ketal). This latter compound V is then reduced to the octahydro 5H-benzazepin-5-one, ketal VI by refluxing the same with LiAlH$_4$.

The latter compound VI is representative of a further class of new and important compounds which are included within the scope of the present invention and which in addition to being useful as intermediates in the preparation of the desired final products I, are useful and valuable in and of themselves as analgesic agents. These new compounds which are more properly characterized as 1,2,3,4,5a,6,9,9a - octahydro - 5H - 1 - benzazepin-5-one, cyclic ethylene ketals may be more appropriately defined by the following formula:

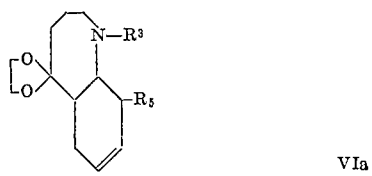

VIa wherein $R^3$ and $R^5$ have the value previously ascribed. As discussed above, the derivatives, wherein $R^5$ is other than hydrogen, require the presence of the desired substituent in the starting material II as defined above. The substituent identified as $R^3$ may be suitably obtained in the desired product by reacting the compound VI with suitable alkyl or benzyl halide in the presence of CHCl$_3$ and NaHCO$_3$. It should of course be understood that the corresponding substituents in the final products I are obtained in a similar manner by a similar reaction which may be undertaken at this step in the synthesis or if desired following the preparation of the final product VIII as shown in the reaction sequence and as described in detail hereinafter.

Completion of the preparation of the final product VIII from the intermediate aminoketal VI may be accomplished in either of two ways. The aminoketal VI may be hydrolyzed with ethanolic hydrochloric acid to produce the benzazepin-5-one hydrochloride VII which in turn is reacted with phenylhydrazine and dilute sulfuric acid to produce the final product VIII. Alternatively, the aminoketal VI may be treated with diluted sulfuric acid which favors indole vs. indolenine formation and thence refluxed with phenylhydrazine. The latter reaction is carried out by refluxing the reactants for a short period of time, such as for example from about 15 minutes to about 2 hours. The reaction mixture is then poured into icy diluted NaOH solution.

It will be apparent by reference to product VIII that further reaction with a suitable reagent is necessary if other than hydrogen is desired at the 12-position. Such a reaction could be carried out with the octahydroindolobenzazepine VIII with sodium hydride or sodium amide in a suitable solvent such as dimethylformamide, toluene or the like followed by reaction with an alkyl halide or a suitable halide derivative to provide the substituents defined by $R^4$ above. Previous descriptions made reference to the substituent on the 5-nitrogen, namely $R^3$. As has been suggested, suitable reaction with VI will result in the desired $R^3$ at the 5-nitrogen of the final product. Alternatively the latter reaction can be effectively carried out by a similar reaction with the final product VIII, thus resulting in the desired $R^3$ substituent in the final product I.

The therapeutic agents of this invention may be administered alone, or in combination with pharmaceutically acceptable carriers, the proportion of which is determined by the solubility and chemical nature of the compound, chosen route of administration and standard pharmaceutical practice. They may be administered orally in the form of tablets or capsules containing such excipients as starch and milk sugar. They may be administered in the form of lozenges in which the active ingredient is mixed with sugar, corn syrups, flavoring agents and dyes. They may be administered orally in the form of solutions which may contain coloring and flavoring agents. They may also be injected parenterally.

The dosage of the present therapeutic agents which will be most suitable will vary with the form of administration and the particular compound chosen, and will also vary with the particular patient under treatment. Treatment will be started with small dosages substantially less than the optimum dose of the compound and increase the dosage by small increments until the optimum effect under the circumstances is reached. It will generally be found that when the composition is administered orally, larger quantities of the agent will be required to produce the same effect as a smaller quantity given parenterally. The compounds are useful in the same manner as other agents having a similar function and the dosage level is of the same order of magnitude as is generally employed with these other therapeutic agents. The therapeutic dosage may be from 10 to 500 milligrams per day and may be administered in several different dosage units. Tablets containing from 25 to 250 mg. of active agent are particularly useful.

Reference now to the specific examples which follow will provide a better understanding of the new compounds of the present invention as well as the novel compounds intermediate thereto and to the method by which such new compounds are prepared.

Example I 2,3,4a,5,8,8a-Hexahydro - 1,4 - naphthoquinone (II) (36.0 g.) is ketalized with ethylene glycol in chloroform solution catalyzed by p-toluenesulfonic acid as described by E. Cole, W. S. Johnson, P. A. Robins and J. Walker, Soc., 1962, 260. The crude reaction mixture is taken to dryness and distilled in vacuo between 125–130°/0.01 mm. The colorless oily produce is dissolved in a small amount of n-hexane and allowed to stand at −10° C. overnight. The separated crystals of 2,3,4a,5,8,8a-hexahydro-1,4-naphthoquinone, cyclic 1-(ethylene ketal) (III) are recrystallized from n-hexane and melt at 64° C. IR spectrum shows the oxo group at 5.85µ.

The ketal derivative (III) (13 g.) is dissolved in 25 ml. of methanol and treated with one mole equivalent amount of hydroxylamine acetate (prepared in 150 ml. of methanol from 4.4 g. of hydroxylamine-HCl and 5.1 g. of sodium acetate). The above filtered hydroxylamine acetate solution spontaneously reacts with the ketone (III) giving rise to 9.3 g. of the ketal oxime derivative, 2,3,4a,5,8,8a-hexahydro-1,4-naphthoquinone, cyclic 1-(ethylene ketal), 4-anti-oxime (IV), M.P. 172–174° C. After recrystallization from ethyl acetate the M.P. is 178–179° C. The spectrum shows strong absorption at 3.25µ.

As has been previously suggested, the foregoing compound IV is representative of and included within the new class of compounds which have valuable biological properties. Such compounds, wherein $R^5$ is present in the B ring fused to the oxime containing ring, are prepared in a similar manner by starting with an appropriately substituted naphthoquinone. For example, utilizing a naphthoquinone having a lower alkyl or alkoxy substituent in the 5, 6, 7 or 8 position in the method of Example I will result in oxime ketal compounds including, but not limited thereto, the following: 5-ethyl-2,3, 4a,8,8a-hexahydro-1,4-naphthoquinone, cyclic 1-(ethylene ketal), 4-antioxime; 9-methoxy-2,3,4a,5,8a-hexahydro-1,4-naphthoquinone cyclic 1-(ethylene ketal), 4- antioxime; 5,8-diethyl-2,3,4a,5,8,8a-hexahydro-1,4-naphthoquinone, cyclic 1-(ethylene ketal), 4-antioxime; 7-propyl-2,3,4a,5,6,7,8,8a - octahydro-1,4-naphthoquinone, cyclic 1-(ethylene ketal), 4-antioxime. Such compounds may of course be utilized in the further steps of the process as described in Example II below.

Example II

The ketal oxime derivative IV obtained according to Example I, 2,3,4a,5,8,8a-hexahydro-1,4-naphthoquinone, cyclic 1-(ethylene ketal), 4-antioxime, (546.9 g.) is dissolved in a solution of 43.0 g. of p-toluenesulfonyl chloride in 300 ml. of pyridine. The reaction mixture is heated to 50° C. At this temperature, an exothermic reaction develops and the temperature rises to 70° C. within a few minutes. After the exothermic reaction ceases, the reaction mixture is allowed to stand for 15–20 hours at room temperature. The red colored mixture is poured onto icy-diluted hydrochloric acid (440 ml. of conc. HCl+1500 ml. of water). The crystalline product, 3,4,5a,6,9,9a-tetrahydro-1H-1-benzazepin-2,5-diene, cyclic 5-(ethylene ketal V), is chloroform extracted, furnishing a tan colored solid residue, 42.0 g. (89.5%). Recrystallization of the crude product from chloroform/n-hexane (1:2) gives 34.0 g.; M.P. 211.5–212° C. IR spectrum possesses bonds at $3.16\mu$ (NH), $6.03\mu$ (lactam oxo).

Example III

To prepare the intermediate VI as shown in the reaction sequence above the product of Example II, the lactam-ketal V (24.0 g.) dissolved in 1250 ml. of tetrahydrofuran is reduced by reversed addition of 5.0 g. of LiAlH$_4$ in a Soxhlet apparatus. After all LiAlH$_4$ is added, reflux is continued for thirteen hours. To the cooled slurry, 500 ml. of ether is added and the excess of LiAlH$_4$ is carefully decomposed by 50 ml. of water. The dried solution furnishes 21.7 g. oil (96.3%3, which is distilled between 100–110° C. (bath temperature)/0.001 mm. The colorless aminoketal 1,2,3,4,5a,6,9,9a-octahydro-5H-1-benzazepin-5-one, cyclic ethylene ketal, (VI) has an $n_D^{20}$=1.5210. IR spectrum shows bonds at $3.05\mu$ (NH) and $6.03\mu$ (C=C).

The product of Example III is, as has been described above, another of the new and valuable intermediates of the present invention. This product is representative of a class of new compounds which have previously been described as those encompassed within the structure VIa. Such compounds are useful in and of themselves but have the further utility of being useful in the production of the desired final products encompassed within Formula I.

It is one of the further aspects of the present invention to prepare those compounds encompassed within VIa by reacting the product of Example III including compounds having substituents in the 6, 7, 8 and 9 (preferred) positions as described in Example I, with an alkyl or phenyl lower alkyl halide in the presence of NaHCO$_3$, or triethylamine and a solvent such as chloroform or dimethylformamide. Compounds obtainable according to this reaction and encompassed within those defined by the structure VIa above includ e9-methyl-1,2,3,4,5a,6,9,9a - octahydro-5H-1-benzazepin-5-one, cyclic ethylene ketal; 1-benzyl-1,2,3,4,5a,6,9,9a-octahydro-5H-1-benzazepin-5-one, cyclic ethylene ketal; 1-p-methyl-benzyl-1,2,3,4,5a,6,9,9a - octahydro-5H-1-benzazepin-5-one, cyclic ethylene ketal; 1-benzyl-9-isopropyl-1,2,3,4,5a,6,9,9a-octahydro-5H-1-benzazepin-5-one, cyclic ethylene ketal; 9 - methoxy-1-benzyl-1,2,3,4,5a,6,9,9a-octahydro-5H-1-benzazepin-5-one, cyclic ethylene ketal; 1-ethyl-1,2,3,4,5a,6,9,9a-octahydro-5H-1-benzazepin-5-one, cyclic ethylene ketal; 1-benzyl-9-ethyl-1,2,3,4,5a,6,9,9a-octahydro-5H-1-benzazepin-5-one, cyclic ethylene ketal; 1-benzyl-9-ethoxy-1,2,3,4,5a,6,9,9a-octahydro - 5H-1 - benzazepin-5-one, cyclim ethylene ketal; 9-methyl-1-benzyl-1,2,3,4,5a,6,9,9a-octahydro-5H-benzazepin-5-one, cyclic ethylene ketal and 9-methoxy-1,2,3,4,5a,6,9,9a-octahydrobenzazepin-5-one, cyclic ethylene ketal.

Example IV 5.0 g. of 1,2,3,4,5a,6,9,9a-octahydro-5H-1-benzazepin-5-one, cyclic ethylene ketal is refluxed in 50 ml. of ethanolic hydrochloric acid (10% w./v.) for one hour. After evaporation to dryness, is is alkalized with diluted sodium hydroxide below +20° C. The dried ether extract is treated with dry hydrochloride acid and the separated solid 1,2,3,4,5a,6,9,9a-octahydro-5H-1-benzazepin-5-one hydrochloride recrystallized from abs. ethanol-ether; M.P. 176.5–177.5° C. IR spectrum possesses the expected bonds at $3.45\mu$ (CH), $3.55$–$3.91\mu$ (salt bond), and $5.90\mu$ (ketone).

Example V 10.0 g. of the aminoketal product of Example III (the starting material of Example IV) is dissolved in a cold mixture of 144 ml. water and 16 ml. of conc. sulfuric acid. 6.4 ml. of phenylhydrazine is added and the reaction mixture refluxed for fifteen minutes. Upon pouring the cooled reaction mixture onto icy diluted sodium hydroxide solution, a light tan-colored free base of Example IV (11.4 g.–70.5%) separated out. The crude base is dissolved in ether, extracted by water, dried and evaporated to dryness. The solid foam is recrystallized from a small amount of diluted hydrochloric acid and recrystallized from methanol-ether. The product, 1,4,4a,5,6,7,12,12b-octahydroindolo(3,2-d)(1)benzazepine hydrochloride (VIII), has a M.P. of 282–283° C. U.V. spectrum possesses the expected indole maxima at 223, 282 and 292 m$\mu$. IR spectrum exhibits bonds at $3.13\mu$ (indole NH) $3.5$–$4.08\mu$ (amine-salt), $6.03\mu$ (>C=C<).

The product of Example V is representative of the compounds of the present invention encompassed within those defined by Formula I. Further reacting such a product VIII with a suitable agent such as an alkylhalide or phenyl alkyl halide including substituted phenyl alkyl halides in a solvent such as CHCl$_3$ in the presence of NaHCO$_3$ provided the desired R$^3$ substituent on the final product VIII.

It is of course understood that the R$^1$ and R$^2$ substituents will be present on the phenylhydrazine used in forming the indole moiety of the final product. The reaction with such a phenylhydrazine is carried out as described in detail in Example V. Suitable phenylhydrazines for the purpose include dimethylphenylhydrazine, diethylphenylhydrazine, p-methoxy-phenylhydrazine, dimethoxyphenylhydrazine, methylenedioxyphenylhydrazine, p-methylphenylhydrazine, p-butylphenylhydrazine and other similarly substituted phenylhydrazines.

Following the procedure outlined in the foregoing examples, utilizing suitably substituted phenylhydrazines of the type defined above, one prepares the compounds encompassed within those defined by Formula I. For example, reacting 9-methyl-1,2,3,4,5a,6,9,9a-octahydro-5H-1-benzazepin-5-one, cyclic ethylene ketal with phenyl hydrazine according to the method of Example V results in 4 - methyl - 1,4,4a,5,6,7,12,12b - octahydroindolo(3,2-d)(1)benzazepine. If p-methylphenylhydrazine is used in this reaction, 4,9-dimethyl-1,4,4a,5,6,7,12,12b-octahydroindolo(3,2-d)(1)benzazepine is obtained. Utilizing 3,4-diethylphenylhydrazine in this reaction, one obtains 9,10-diethyl - 4 - methyl - 1,4,4a,5,6,7,12,12b-octahydroindolo(3,2-d)(1)benzazepine. Reacting the latter with ethyl iodide, following reaction with sodium hydride in the presence of dimethylformamide, results in 9,10,12-triethyl - 4 - methyl - 1,4,4a,5,6,7,12,12b - octahydroindolo-(3,2-d)(1)benzazepine. If in the preceding reaction with phenylhydrazine, the starting naphthoquinone included an ethyl substituent at the 8-position or 8-ethyl-2,3,4a,5,8,8a-hexahydro-1,4-naphththoquinone, one obtains 4-ethyl-1,4,4a,5,6,7,12,12b - octahydroindolo(3,2 - d)(1)benzazepine.

Following the procedure outlined above and the method of the specific examples, it is possible to obtain according to the methods described, the following new compounds: 12-ethyl - 5 - methyl-1,4,4a,5,6,7,12,12b-octahydroindolo-(3,2-d)(1)benzazepine; 12 - ethyl-5-benzyl - 1,4,4a,5,6,7,12,12b - octahydroindolo(3,2-d)(1)benzazepine; 5-benzyl-12-propyl - 1,4,4a,5,6,7,12b - octahydroindolo(3,2-d)(1)-benzazepine; 12-benzyl - 5 - ethyl-1,4,4a,5,6,7,12,12b-octahydroindolo(3,2-d)(1)benzazepine; 5 - benzyl - 4 - ethyl-1,4,4a,5,6,7,12,12b - octahydroindolo(3,2 - d)(1)benzazepine; 9,10-dimethoxy-1,4,4a,5,6,7,12,12b-octahydroindolo-(3,2-d)(1)benzazepine; 12 - ethyl - 9,10 - methylenedioxy-1,4,4a,5,6,7,12,12b - octahydroindolo(3,2 - d)(1)benzazepine; 9-methoxy - 12 - benzyl-1,4,4a,5,6,7,12,12b-octahydroindolo(3,2-d)(1)benzazepine; 5,12 - dibenzyl-1,4,4a,5,6,7,12,12b - octahydroindolo(3,2 - d)(1)benzazepine; 5-benzyl-4-12-dipropyl,4,4a,5,6,7,12,12b - octahydroindolo-(3,2-d)(1)benzazepine; 12 - benzyl - 1,4,4a,5,6,7,12,12b-octahydroindolo(3,2-d)(1)benzazepine; 4 - methyl - 12-propyl - 1,4,4a,5,6,7,12,12b - octahydroindolo(3,2-d)(1)benzazepine; 12-benzyl-9,10 - dimethoxy - 1,4,4a,5,6,7,12,12b-octahydroindolo(3,2-d)(1)benzazepine; 12-benzyl-5-butyl - 1,4,4a,5,6,7,12,12b - octahydroindolo(3,2-d)(1)benzazepine; and 4-methoxy - 12 - propyl-1,4,4a,5,6,7,12,12b-octahydroindolo(3,2-d)(1)benzazepine.

I claim:
1. A compound selected from the group consisting of those having the formula:

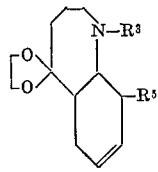

wherein $R^3$ is selected from the group consisting of hydrogen and benzyl; and $R^5$ is selected from the group consisting of hydrogen, lower alkyl and lower alkoxy.

2. A compound as described in claim 1 which is: 1,2,3,4,5a,6,9,9a-octahydro-5H-1-benzazepin-5-one, cyclic ethylene ketal.

3. A compound as described in claim 1 which is: 9-methyl-1,2,3,4,5a,6,9,9a-octahydro - 5H - 1 - benzazepin-5-one, cyclic ethylene ketal.

4. A compound as described in claim 1 which is: 1-benzyl-1,2,3,4,5a,,6,9,9a-octahydro-5H - 1 - benzazepin-5-one, cyclic ethylene ketal.

5. A compound as described in claim 1 which is: 1-benzyl-9-ethyl-1,2,3,4,5a,6,9,9a-octahydro-5H - 1 - benzazepin-5-one, cyclic ethylene ketal.

6. A compound as described in claim 1 which is: 9-methoxy-1,2,3,4,5a,6,9,9a-octahydro-5H - 1 - benzazepin-5-one, cyclic ethylene ketal.

References Cited

Sallay, "Tetrahedron Letters" No. 36, 1964, pp. 2443–50.

ALEX MAZEL, Primary Examiner

JAMES H. TURNIPSEED, Assistant Examiner

U.S. Cl. X.R.

260—239, 326.9, 586; 424—244, 274, 278